United States Patent [19]

Kaneko et al.

[11] Patent Number: 4,785,311

[45] Date of Patent: Nov. 15, 1988

[54] RECORDING HEAD APPARATUS AND METHOD HAVING PLURALITIES OF CROSSED ELECTRODES

[75] Inventors: Shuzo Kaneko, Tokyo; Akihiro Mouri, Kokubunji; Tsutomu Toyono, Yokohama, all of Japan

[73] Assignee: Canon Kabushiki Kaisha, Tokyo, Japan

[21] Appl. No.: 7,178

[22] Filed: Jan. 27, 1987

[30] Foreign Application Priority Data

Jan. 30, 1986 [JP] Japan .................................. 61-16747

[51] Int. Cl.[4] .............................................. G01D 15/16

[52] U.S. Cl. ................................ 346/1.1; 346/76 PH; 346/140 R

[58] Field of Search ............. 346/140, 75, 1.1, 76 PH, 346/76 R

[56] References Cited

U.S. PATENT DOCUMENTS

| | | | |
|---|---|---|---|
| 3,655,379 | 4/1972 | Gundlach | 96/27 |
| 3,790,703 | 2/1974 | Carley | 346/140 X |
| 4,164,745 | 8/1979 | Cielo | 346/140 |
| 4,164,746 | 8/1979 | Anselrode | 346/140 |
| 4,484,948 | 11/1984 | Merritt | 106/31 |
| 4,561,789 | 12/1985 | Saito | 400/120 |
| 4,660,058 | 4/1987 | Cordery | 346/140 |

FOREIGN PATENT DOCUMENTS

| | | |
|---|---|---|
| 118493 | 7/1984 | Japan . |
| 225990 | 12/1984 | Japan . |
| 2387 | 1/1985 | Japan . |
| 4093 | 1/1985 | Japan . |
| 21297 | 2/1985 | Japan . |
| 46264 | 3/1985 | Japan . |
| 206677 | 10/1985 | Japan . |

OTHER PUBLICATIONS

Saito, et al., "Proposal of Thermal Rheography", National Convention Record, The Institute of Electronics & Communication Engineers of Japan, (Paper 1295 w/translation).

Yamaguchi, et al., "Study of Recording Characteristics of Thermal Rheography", National Convention Record, The Institute of Electronics & Communication Engineers of Japan (Paper 1296 w/translation).

*Primary Examiner*—Joseph W. Hartary

*Attorney, Agent, or Firm*—Fitzpatrick, Cella, Harper & Scinto

[57] ABSTRACT

Image recording is achieved with the use of a cylindrical recording head in which ink is contained, a plurality of ink passage holes being formed on a circumferential surface thereof. The recording head includes a plurality of scanning electrodes and a plurality of signal electrodes to which an image signal is transmitted. A heating material is disposed around each of the ink passage holes in the area surrounded by the electrodes. In response to the image signal, a certain number of ink passage holes are heated by means of the selected heating materials to which electric current is supplied via the electrodes whereby ink of which viscosity is reduced under the effect of thus generated heat flows to the outside through the ink passage holes until it is transferred onto a recording medium.

19 Claims, 11 Drawing Sheets

RECORDING HEAD APPARATUS AND METHOD HAVING PLURALITIES OF CROSSED ELECTRODES

BACKGROUND OF THE INVENTION

1. Field of the Invention

The present invention relates to a recording head usable for carrying out recording on a recording medium (for instance, paper, plastic sheet for OHP (Overhead Projection) or the like) using a specific kind of ink as well as a method of carrying out recording with the use of the aforesaid recording head.

Further, the present invention relates to a recording head and a method of carrying out recording with the use of the head, both of which are usable in image processors, electronic typewriters, facximiles, various kinds of display board or the like.

2. Related Background Art

Among a number of hitherto known recording apparatuses a heat sensitive transferring type recording apparatus has the possibility of using plain papers, and in addition possesses generic features such as small size, light weight, lower noise and others. Accordingly, the heat transfer type recording apparatus has been increasingly put into practical use in recent years.

A method of operating the heat sensitive transferring type recording apparatus as mentioned above is practiced by way of the steps of using an ink film which is coated with heat fusible ink, heating the ink film by means of a recording head to build a certain image pattern, and then transferring the thus fused ink onto a recording medium.

It has been pointed out that the conventional method has problems such as comparatively high operating cost due to the fact that the ink film should be thrown away after completion of usage, and the complicated disposing operation of the used film.

Further, the apparatus of the type using the above-mentioned ink film has problems as mentioned below.

To facilitate understanding of the present invention, a brief description will be provided as to the case where serial printing is effected with the aid of the conventional recording apparatus. As shown in FIG. 2, printing is effected on a recording medium 3 by means of a heated recording head 1 while a carriage 2 is displaced in the direction identified by arrow A. On completion of printing across one line, a platen roller 15 is rotated in the direction identified by arrow B to shift the recording medium 3 by a distance equivalent to one line in the B-direction so that the next printing is initiated.

Incidentally, the recording head 1 for carrying out recording is constructed in such a manner as illustrated in FIG. 3. FIG. 3 is a view as seen in the direction identified by arrow I in FIG. 2. As is apparent from the drawing, seven heating elements 16 are disposed in vertical alignment and a common electrode 17 common to the heating elements 16 is connected to the latter while a signal electrode 18 is connected to each of them. To identify the heating elements 16, symbols $C_1$, $C_2$, $C_3$, $C_4$, $C_5$, $C_6$ and $C_7$ are used.

When a numeral "7" is printed, a certain intensity of voltage is applied to each of the heating elements 16 in accordance with the time chart shown in FIG. 4. At this moment the carriage 2 is caused to move at a speed of v in the A-direction in FIG. 2. When it is assumed that the applied voltage has a period of t, an electric current supply time is represented by t/2 and a cooling time is represented also by t/2, because the heating elements 16 are heated by application of voltage to them (to effect printing), but there is a necessity for holding a certain period of cooling time until they are heated at the next time by repeated application of voltage to them. FIG. 5 is a time chart illustrating how a heating temperature T of one of the heating elements 16 varies when voltage is continuously applied to it. As is apparent from the drawing, temperature increases gradually to reach the highest point Ts, as long as voltage is applied, and when the application of voltage is interrupted, the temperature decreases gradually to reach the initial temperature To. Thus, the increase and decrease of temperature are repeated in the above-described manner in accordance with the ON-OFF condition of the voltage.

Referring to FIG. 4, at the time of $t_1$ voltage is applied only to $C_1$ among the heating elements 16, at the next time of $t_2$ voltage is applied to $C_1$, $C_5$, $C_6$ and $C_7$, at the next time of $t_3$ voltage is applied to $C_1$ and $C_4$, at the next time of $t_4$ voltage is applied to $C_1$ and $C_3$, and at the next time of $t_5$ voltage is applied to $C_1$ and $C_2$ whereby a numeral "7" as shown in FIG. 6 is printed.

However, due to the fact that there is a necessity for cooling the heating elements 16 for a certain period of time as mentioned above, it is not easy to effect printing at a higher speed. If a moving speed v of the carriage is increased twice and a frequency of voltage application is reduced to a half of the normal one t, as shown in FIGS. 7 to 9, one of the heating elements 16 has the a maximum temperature of Ts/2 such that voltage is continuously applied to it, because the period of time of voltage application is reduced to t/4, as shown in FIG. 7. As a result, there occurs a shortage in the amount of generated heat, causing printing to be achieved at a lower visual density as shown in FIG. 8. Obviously, this is not desirable.

Further, if the carriage is caused to move at a moving speed two times as high as the normal moving speed v, but a voltage application period is set equal to the normal voltage application period t, as shown in FIGS. 10 to 12, each of the heating elements 16 reaches the highest heating temperature Ts just like in the normal operative state as shown in FIG. 11, because voltage is applied to the heating elements 16 for the same period of time t/2 as in the normal operative state. However, due to the fact that the moving speed of the carriage is set to 2v, printing is achieved with an open space produced between the adjacent printed dots as shown in FIG. 12. As a result, the whole printed image exhibits an elongation in the transverse direction.

To obviate the foregoing problems as pointed out with respect to the conventional recording apparatus, there is a proposal as to a recording method as shown in FIG. 1. For practicing the proposed method, a recording head 1 usable for heat sensitive recording includes a heating member **1*d* having an ink passage hole 1*f* formed therein through which ink passes. Semisolid ink is contained in an ink container and when the heating member 1*d* generates heat, ink existent in the vicinity of the heating member 1*d* reduces its viscosity whereby it flows through the passage hole 1*f* under the effect of pressure exerted in the ink container in the direction toward the passage hole 1*f*. In practice, the recording head is so constructed that a plurality of ink passage holes 1*f* are arranged in an array-shape and an ink image is built on a recording medium 3 in response to heating signals selectively transmitted to heating members 1*d*** allocated to the corresponding passage holes 1*f* through which softened ink flows to the outside.

The proposed method has advantageous features that there is no necessity for ink film, and a high efficiency is obtainable in respect of thermal energy because ink is directly heated without using any type of film.

The present invention has been made as a result of further development work conducted in connection with the above-mentioned conventional recording method.

SUMMARY OF THE INVENTION

An object of the present invention is to provide a recording head and a method of carrying out recording with the use of the recording head, both of which assure that a clearly recorded image is built.

Other object of the present invention is to provide a recording head and a method of carrying out recording with the use of the head, both of which assure that image recording is effected at a reduced running cost.

Another object of the present invention is to provide a recording head and a method of carrying out recording with the use of the head, both of which assure that image recording is effected without any occurrence of mulfunction such as ink tailing, ink overlapping or the like.

Another object of the present invention is to provide a recording head and a method of carrying out recording with the use of the head, both of which assure that image recording is effected without any use of ink film.

Another object of the present invention is to provide a recording head and a method of carrying out recording with the use of the head, both of which assure that image recording is effected at a high operational speed without any reduction of image density as well as without any occurrence of ink tailing from a recorded image.

To accomplish the above objects there is proposed, according to one aspect of the present invention, a recording head for carrying out recording on a recording medium by transferring ink onto the recording medium, comprising an ink containing portion in which ink is contained, a plurality of electrodes disposed so that they intersect with one another, a heating portion disposed between the adjacent electrodes to heat ink contained in the ink containing portion, and a plurality of apertures through which ink passes to the outside under the effect of heating of the heating portion, each of the apertures being located at the position surrounded by the electrodes.

Further, there is proposed according to another aspect of the present invention a method of carrying out recording on a recording medium by transferring ink onto the recording medium, comprising the steps of displacing an ink containing portion relative to the recording medium while the ink containing portion comes in contact with the recording medium, the ink containing portion being such that ink is contained therein and being formed with a number of ink passage holes over the circumferential surface thereof, reducing the viscosity of the ink at a position in proximity to the ink passage holes which are selectively heated, and causing ink of which viscosity has been reduced to flow to the outside through the selected ink passage holes until it is transferred onto the recording medium.

Other objects, features and advantages of the present invention will become clearly apparent from reading the following description which has been prepared in conjunction with the accompanying drawings.

BRIEF DESCRIPTION OF THE DRAWINGS

The accompanying drawings will be briefly described below.

DETAILED DESCRIPTION OF THE PREFERRED EMBODIMENT

Now, the present invention will be described in greater detail hereafter with reference to the accompanying drawings which illustrate a preferred embodiment thereof.

A recording head usable for practicing the embodiment of the invention is so constructed that a plurality of electrodes divided in both the longitudinal and circumferential directions of a cylindrical container in which an ink can be contained are disposed thereon. A heating portion is formed between adjacent electrodes, and an ink passage hole in the form of a through hole is provided at the position where the heating portion is located. Recording is effected with the use of the recording head as constructed in the above-described manner.

Since the recording head is constructed as described above, image recording is achieved in such a manner that when a certain intensity of voltage is applied to some of the electrodes arranged in the matrix shape in response to image information while the recording head is displaced in the contacted state with a recording medium, the heating portions associated with the electrodes to which voltage has been applied generate heat. Then, the viscosity of the ink is reduced under the effect of the generated heat, ink is caused to flow through the ink passage hole at each of the heating portions, and is transferred onto the recording medium.

Next, an explanation will be given as to a concrete embodiment of a recording apparatus in which the above-described recording head is incorporated with reference to four drawings.

Figure 13:
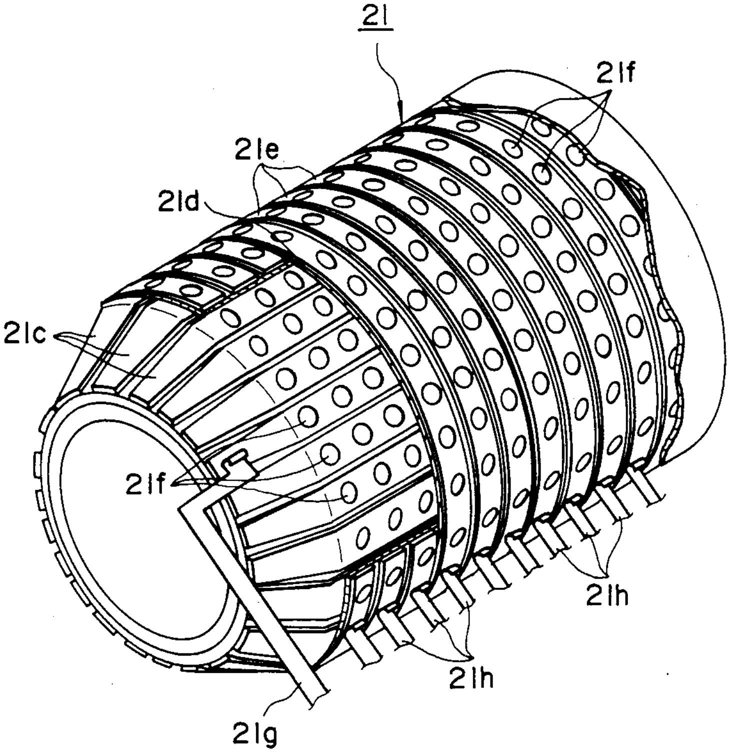
FIG. 13 is a perspective view of a recording head in accordance with an embodiment of the invention.
Figure 14:
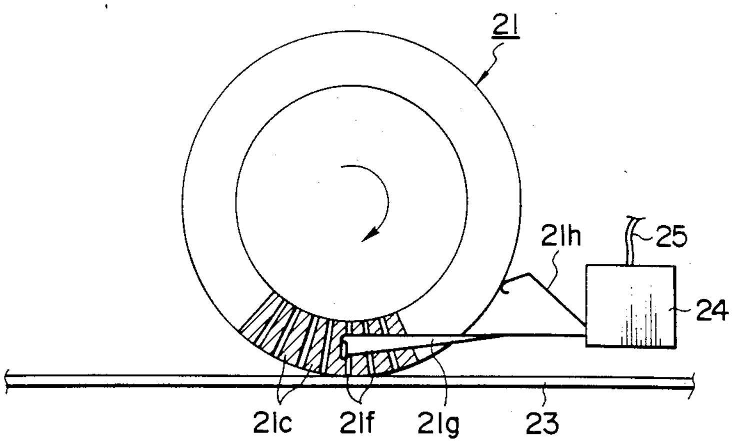
FIG. 14 is a cross-sectional view of the recording head in FIG. 13.
Figure 15:
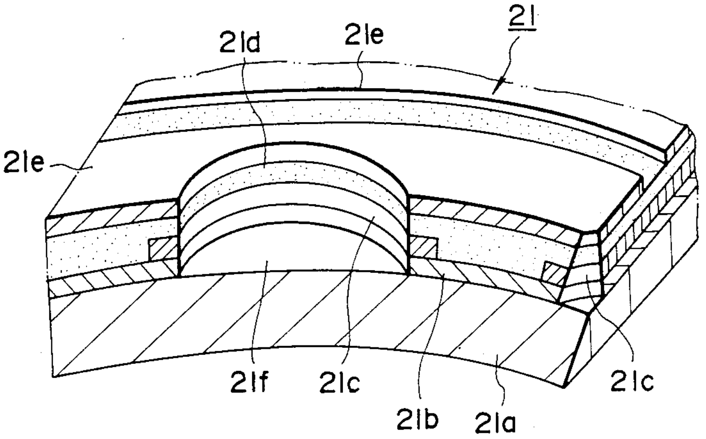
FIG. 15 is an enlarged schematic sectional perspective view of a dot formed through the wall of the recording head.
Figure 16:
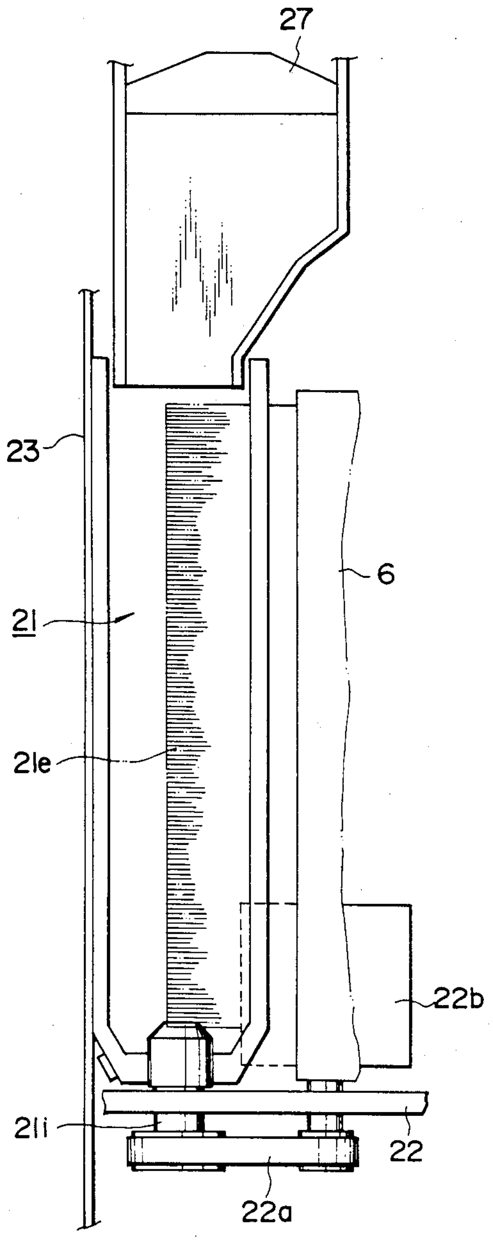
FIG. 16 is a schematic illustrative view of a serial type recording apparatus to which the present invention is applied.

FIG. 13 is a perspective view of the recording head, FIG. 14 is a cross-sectional view of the recording head in FIG. 13, FIG. 15 is an enlarged fragmental perspective view of a dot portion, and FIG. 16 is a schematic view of a serial type recording head.

In the drawings reference numeral 21 designates a recording head which is designed in the cylindrical configuration. The recording head 21 is constructed in the form of a container in which so-called heat fusible ink (inclusive of a type of ink which is softened or sublimated by heating) is contained wherein the heat fusible ink is such that it maintains high viscosity at a room temperature but the viscosity is reduced as temperature increases. As shown in FIG. 16, the recording head 21 is mounted on a carriage 22 adapted to move in the direction of recording so that it is rotated while coming in contact with the recording medium 23 as the carriage 22 moves. Specifically, as shown in FIGS. 13 and 15, the recording head 21 is so constructed that an insulating film 21*b* is extended over a mesh-shaped porous base 21*a* constituted by metallic fibers of various kinds of alloys such as stainless steel or the like, and a plurality of scanning electrodes 21*c* are distributed in the noncontacted state in the circumferential direction and are disposed on the insulating film 21*b*. Further, a layer of resister type heating material 21*d* (of which a main component comprises tantalium nitride, ruthenium oxide or the like) is extended over the scanning electrodes 21*c*, and a plurality of annular signal electrodes 21*e* (made of nickel, chromium, gold, aluminum or alloys therefrom) are distirbuted in the non-contacted state in the longitudinal direction of the cylindrical shape disposed on the layer of heating material 21*d* whereby a matrix structure having the scanning electrodes 21*c* and the signal electrodes 21*e* intersected with one another is obtained. An ink passage hole (hereinafter referred to as dot) 21*f* extending through both the scanning electrode 21*c* and the signal electrode 21*e* is provided at the position where the scanning electrode 21*c* is intersectedwwith the signal electrode 21*e*. Further, a scanning brush 21*g* is brought in contact with the scanning electrodes 21*c* at the position where the cylindrical recording head 21 comes in contact with the recording medium 23 so that a scanning signal is transmitted to the recording head 21 via the scanning brush 21*g*, while a plurality of signal brushes 21*h* arranged separately from one another in the insulated state are brought in contact with the signal electrodes 21*e* so that image signals are transmitted to the recording head 21 via the signal brushes 21*h*. Incidentally, in FIG. 14 reference numeral 24 designates a connector and reference numeral 25 does a signal cable.

Next, the operation of the recording apparatus as constructed in the above-mentioned manner will be described below. As shown in FIG. 16, as the carriage 22 is caused to move while the recording head 21 comes in pressure contact with the recording medium 23, the recording head 21 is displaced while rotating on the recording medium 23 about a shaft 21*i* which is rotationally driven by means of a motor 22*b* via an endless belt 22*a* during recording operation of the recording head 21. When voltage is applied to both the signal electrodes 21*e* and the scanning electrode 21*c* in response to image information which is transmitted from a signal source 26, the heating material 21*d* located at the position where the electrodes intersect with one another generates heat. At this moment the scanning brush 21*g* comes in contact with the scanning electrode 21*c* at the position where the recording head 21 is brought in contact with the recording medium 23, as shown in FIG. 14. Thus, the vicosity of the ink located at the intersection is reduced under the influence of thus generated heat and thereby the ink having reduced viscosity is caused to flow through the dot 21*f* located at the intersection until it is transferred onto the recording medium 23.

On the other hand, due to the fact that a sufficient intensity of electric current does not flow through the heating material 21*d* located around the dots 21*f* at which no recording is effected, the ink is maintained still at a highly viscous state. Accordingly, no ink oozes from the dots 21*f* and no recording is effected on the recording medium 23.

As will be apparent from the above description, a required image can be recorded on the recording medium 23 by way of the steps of applying voltage to the signal electrodes 21*e* and the scanning electrode 21*c* via the signal brushes 21*h* and the scanning brush 21*g* in response to image information transmitted from the signal source 26, heating the heating material 21*d* at predetermined positions and oozing the ink from predetermined dots 21*f*.

It should be noted that the amount of ink consumed by the recording operation is normally replace with other ink which is delivered to the area in the vicinity of the heating material 21*f* by actuating a pressure member 27 (adapted to move under the effect of pneumatic pressure transmitted from a pump (not shown) to impart pneumatic pressure to the interior of the cylindrical recording head 21). To assure smooth replacement of ink, it is preferable that the ink is prepared in the form of a semisolid powder or a solid powder. Incidentally, to compensate for consumption of ink in the recording head 21, the pressure member 27 may be removed therefrom so that new ink can be supplied through the opening. Alternatively, the recording head 21 may be additionally provided with an openable cover through which new ink can be supplied into the interior thereof.

Now, a description will be given below as to the ink contained in the recording head 21. Typically, heat fusible ink is employable for the recording head 21. The heat fusible ink is prepared by dispersing or dissolving coloring agent in heat fusible binder and its viscosity in the molten state, adhesive power or the like are properly adjusted by adding elastomer or a like material to the heat fusible binder.

With respect to the heat fusible binder, a natural or synthetic wax, resin or the like material is used singly or in the form of a mixture of two or more kinds of materials as the main component. For instance, when another heat fusible binder having supercoolability is added to the first-binder mentioned heat fusible binder in the presence of an oily substance under proper control, it is found that a high quality recorded image can be obtained, even if there is some distance between the position where heating is effected and the position where ink is transferred onto the recording medium 23 while the signal electrodes 21*e* are interposed therebetween. It should be noted that the binder having supercoolability (ability to be supercooled) is such that it is maintained at the molten or softened state for predetermined periods of time even at a temperature lower than its original melting point or softening point in the case where it is cooled down from the molten or softened state after it is heated up to a temperature higher than the melting point (softening point), and the binder as mentioned above itself is known well.

To prepare the heat fusible binder constituting ink, natural wax such as whale wax, beeswax, lanolin, carnauba wax, candellilla wax, montan wax, ceresin wax or the like, petroleum wax such as paraffin wax, microcrystalline wax or the like, synthetic wax such as oxided wax, ester wax, lower molecular polyethylene, Fischer-tropsch wax or the like, higher fatty acid such as raulin acid, myrystic acid, palmitic acid, stearic acid, behenic acid or the like, higher alcohol such as steryl alcohol, behenil alcohol, esters such as fatty acid ester of cane sugar, fatty acid ester of sorbitan or the like, amides such as oleyl amide or the like and elastomers such as polyamide resin, polyester resin, epoxy resin, polyurethane resin, polyacrylic resin, polyvinyl chloride resin, cellulose resin, polyvinyl alcohol resin, petroleum resin, phenol resin, polystylene resin, natural rubber, styren butadiene rubber, isoprene rubber, chloroprene rubber or the like are employed in the form of a mixture with a properly determined amount of plasticizer and oily substance such as mineral oil, vegitable oil or the like while its melting temperature and viscosity in the molten state are controlled correctly.

With respect to the coloring agent comprising the heat fusible ink in coexistence of the heat fusible binder, all of dyeing materials and pigments such as carbon black or the like are employable. They may be used either singly or in the form of a mixture comprising two or more kinds. It is preferable that the content of coloring agent contained in the above-mentioned ink is determined in the range of 1 to 40%.

Next, a description will be provided as to a system for driving the recording head 21. To facilitate understanding the present invention, an explanation will be given as to an example where the scanning electrodes 21*c* are divided into n pieces of electrodes comprising $L_1$, $L_2$, . . . Ln and the signal electrodes 21*e* are divided into seven pieces of electrodes comprising $C_1$, $C_2$, . . . $C_7$.

Figure 17:
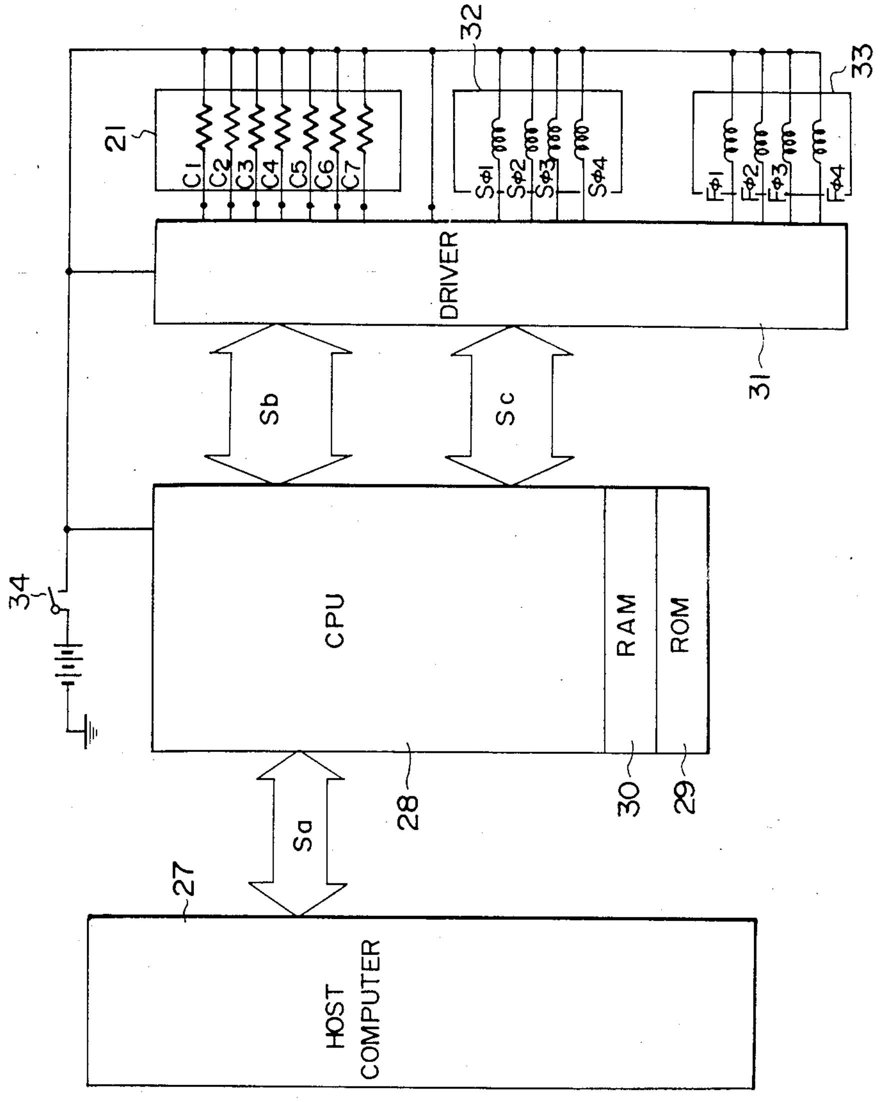
FIG. 17 is a block diagram illustrating a control section in the recording apparatus.

FIG. 17 is a block diagram which shows a control section for the recording apparatus in accordance with the illustrated embodiment of the invention.

In the drawing, reference numeral 27 designates a host computor for controlling the recording apparatus. As is apparent from the drawing, the host computor 27 is electrically connected to a central processing unit (hereinafter referred to as CPU) 28 via a signal cable Sa to mainly control recording operations. Further, reference numeral 29 designates a read only pg,20 memory (hereinafter referred to as ROM) having a control program incorporated therein for the recording apparatus, and reference numeral 30 does a random access memory (hereinafter referred to as RAM) which is utilized by CPU 28.

CPU 28 is adapted to control a driver 31 via signal cables Sb and Sc. The driver 31 is electrically connected to the signal electrodes $C_1$, $C_2$, . . . $C_7$. Further, driver 31 it is electrically connected to a plurality of energizing phases $S\phi_1$ to $S\phi_4$ in a pulse motor 32 for driving the recording head 21 in the direction of scanning. Driver 31 is connected to a plurality of energizing phases $F\phi_1$ to $F\phi_4$ in a pulse motor 33 for relatively feeding the recording medium 23 after the recording head 21 is shifted to the next line. Thus, each of the dots 21*f* and each of the phases are energized under the proper control of CPU 28 whereby the required printing operation is performed. Further, reference numeral 34 designates an electric power switch for the recording apparatus. When the power switch 34 is turned on, CPU 28, the driver 31, the recording head 21, and the pulse motors 32 and 33 become operative respectively.

Figure 18:
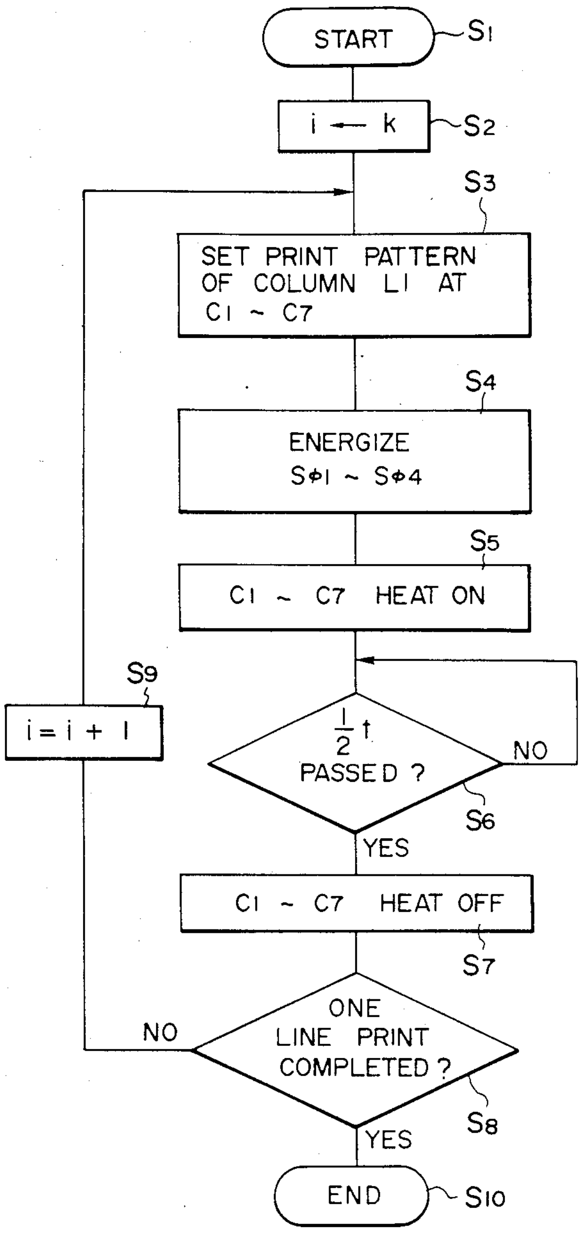
FIG. 18 is a flow chart illustrating the steps of carrying out printing according to the present invention.

Next, a description will be provided below of FIG. 18 which is a flow chart of the printing operation to be performed across one line by means of the recording head 21.

First, the printing operation starts at a step $S_1$. While an initial value of i at a step $S_2$ is shifted to k, a printing pattern is set at the signal electrodes $C_1$, $C_2$, . . . $C_7$ on the column $L_1$ of the scanning electrode at a step $S_3$. Then, at a step $S_4$ the energizing phases $S\phi_1$ to $S\phi_4$ in the pulse motor 32 for driving the recording head 21 in the direction of scanning are energized in the direction of printing, and at a step $S_5$ voltage starts to be applied to perdetermined ones among the signal electrodes $C_1$, $C_2$, . . . $C_7$. Next, at a step $S_6$ voltage continues to be applied thereto for a period of time of t/2 and at a step $S_7$ applying of voltage to the signal electrodes $C_1$, $C_2$, . . . $C_7$ is interrupted (to assume the floated state). Thereafter, it is determined at a step $S_8$ whether a printing operation across one line is completed or not. If it is found that the printing operation across one line is not completed, the aforesaid i is increased at a step $S_9$ and the process returns to return to the step $S_3$. If it is found that the printing operation across one line has been completed, the process shifts to a step $S_{10}$ at which the printing operation across one line comes to an end.

Next, a description will be given below with reference to FIGS. 19 to 21 as to the case where the recording head 21 is caused to move at a speed of 2*v* (where v designates a normal moving speed of the carriage).

Figure 1:
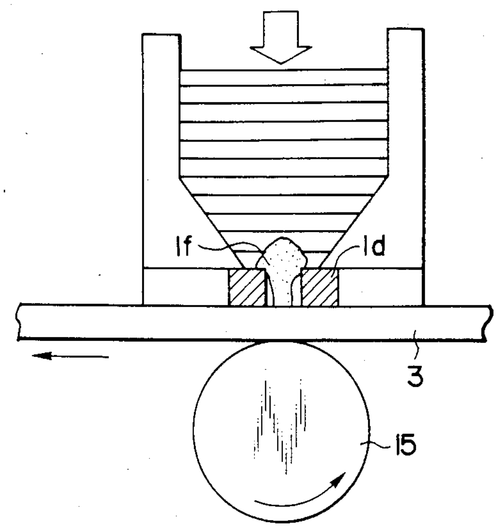
FIG. 1 PRIOR ART
FIGS. 1 to 12 are illustrative views explaining the related prior art.
Figure 2:
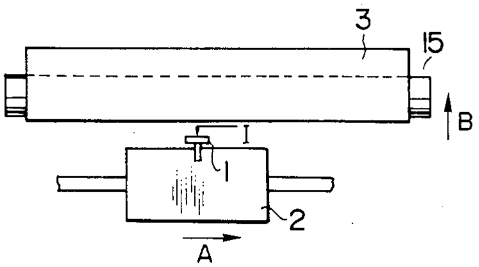
FIG. 2 PRIOR ART
Figure 3:
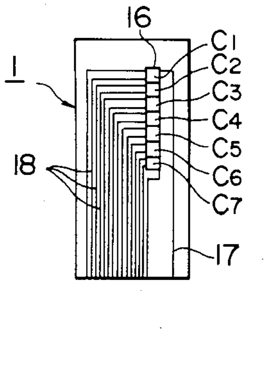
FIG. 3 PRIOR ART
Figure 4:
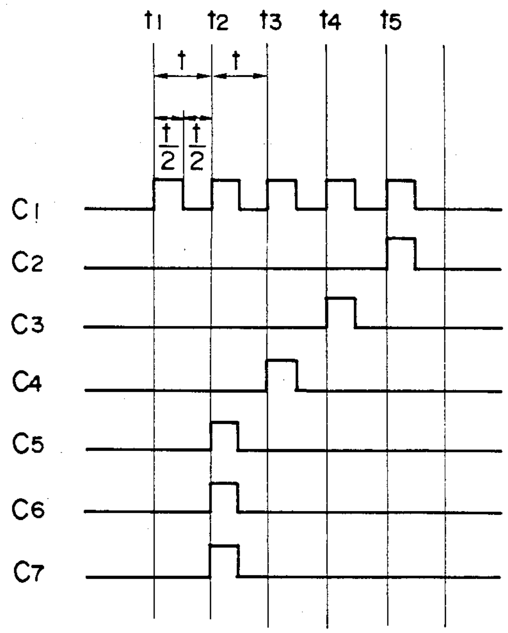
FIG. 4 PRIOR ART
Figure 5:
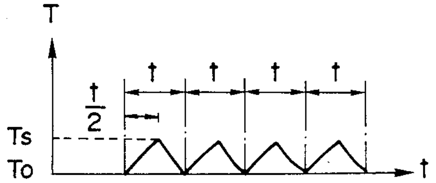
FIG. 5 PRIOR ART
Figure 6:
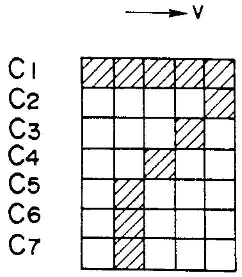
FIG. 6 PRIOR ART
Figure 7:
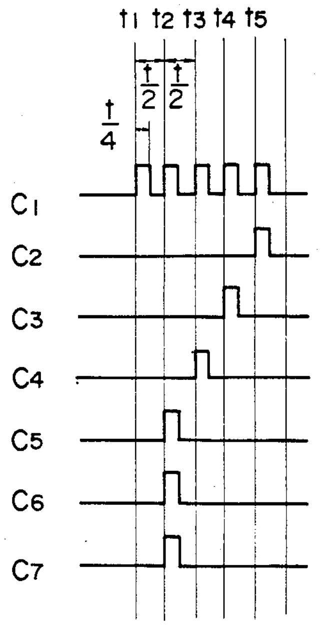
FIG.7 PRIOR ART
Figure 8:
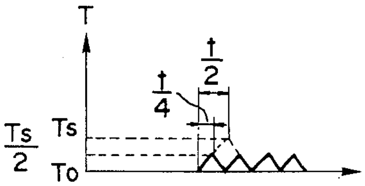
FIG.8 PRIOR ART
Figure 9:
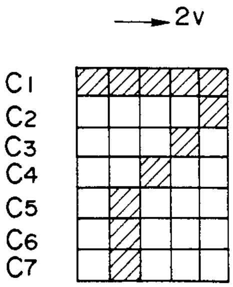
FIG.9 PRIOR ART
Figure 10:
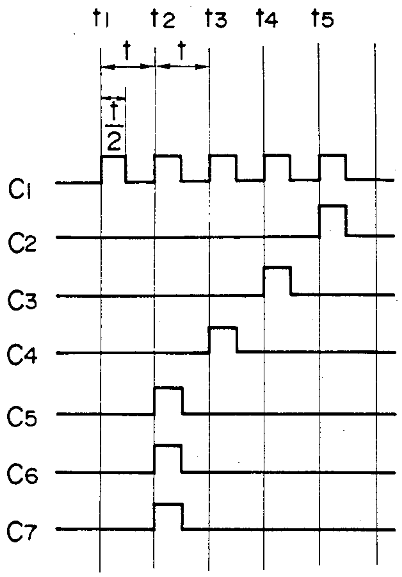
FIG.10 PRIOR ART
Figure 11:
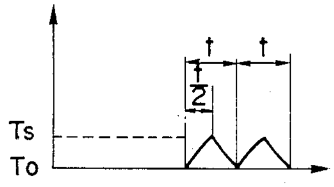
FIG.11 PRIOR ART
Figure 12:
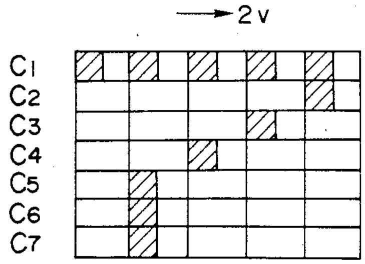
FIG.12 PRIOR ART
Figure 19:
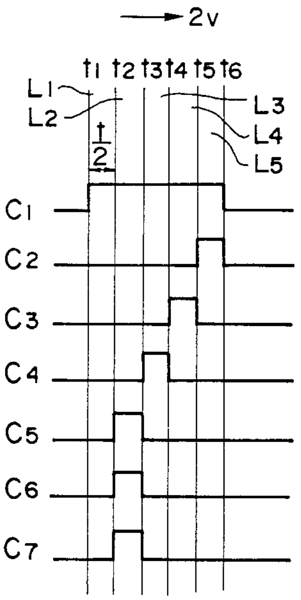
FIGS. 19 to 21 are diagrams illustrating the timing relation between displacement of the recording head and heating.
Figure 20:
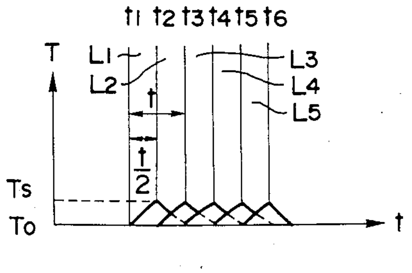

As shown in FIG. 19, at the time $t_1$ the scanning electrode 21*c* on the column $L_1$ comes in contact with the scanning brush 21*g* whereby the signal electrode $C_1$ among the signal electrodes $C_1$ to $C_7$ is set to ON. This leads to a result that only the heating material 21*d* corresponding to the dot 21*f* located at the stage $C_1$ and the column $L_1$ is heated at the time of $t_1$. Thereafter, voltage is applied at a voltage applying frequency of t/2 and at the time of $t_2$ ($t_2=t_1+t/2$) the scanning electrode 21*c* on the column $L_2$ comes in contact with the scanning brush 21*g* whereby the heating materials 21*d* corresponding to the dots 21*f* located at the stage $C_1$ and the column $L_2$, the stage $C_5$ and the column $L_2$, the stage $C_6$ and the column $L_2$ and the stage $C_7$ and the column $L_2$ are heated. This is repeated in the same manner. Namely, at the time of t3 the heating materials corresponding to the dots 21*f* located at the stage $C_1$ and the column $L_3$; as well as the stage $C_4$ and the column $L_3$ are heated at the time of $t_4$ the heating materials 21*d* corresponding to the dots 21*f* located at the stage $C_1$ and the column $L_4$ as well as the stage $C_3$ and the column $L_4$ are heated; and at the time of $t_5$ the heating materials 21*d* corresponding to the dots 21*f* located at the stage $C_1$ and the column $L_5$ as well as the stage $C_2$ and the column $L_5$ are heated. Since in the illustrated embodiment a period of time for which voltage is applied to each of the resister type heating materials 21*d* is set to t/2, printing can be achieved with a high degree of sharpness. Further, since the heating materials located at different positions are heated at every time when printing is effected, there is no necessity for cooling time as in the conventional embodiments shown in FIGS. 5 and 8. FIG. 20 is a time chart relative to a heating temperature T as measured at each of the dots in the case where the heating materials 21*d* corresponding to the dots located at a certain stage (for instance, Stage $C_1$) are continuously heated one after another as seen in the direction of arrangement of the columns (namely, in the case where at the time of $t_1$ the heating material 21*d* corresponding to the dot located at the stage $C_1$ and the column $L_1$ is heated, at the time of $t_2$ the heating material **21*d* corresponding to the dot located at the stage $C_3$ and the column $L_3$ is heated, and at the time $t_3$ the heating material 21*d* corresponding to the located at the stage $C_1$ and the column $L_5$ is heated). Due to the fact that in spite of continuous heating in that way the position where the dot is heated at the time of $t_1$ is different from the position where the dot is heated at the time of $t_2$ and therefore each of the heated dots has a sufficiently long period of time to be cooled, there is not any necessity for cooling time in the conventional recording apparatus as shown in FIGS. 5 and 8**.

Figure 21:
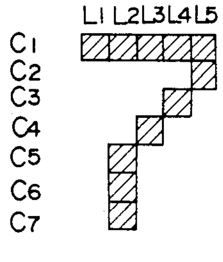

Further, even when the carriage 22 is caused to move in a higher speed (2v), printing can be achieved at a high degree of sharpness as shown in FIG. 21.

Figure 22:
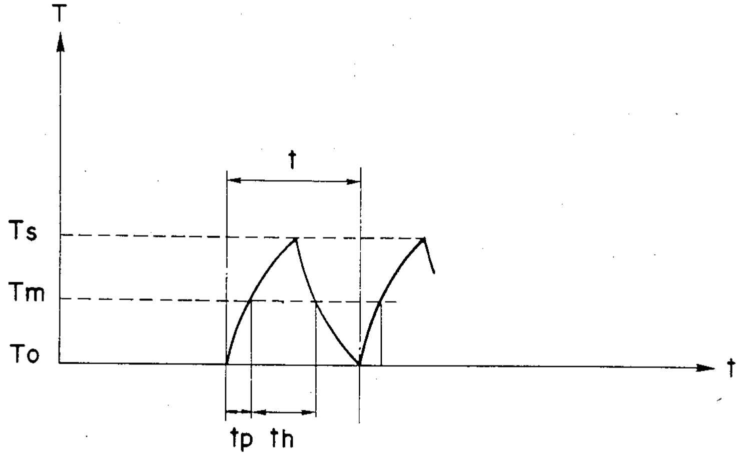
FIG. 22 is a time chart illustrating a heating temperature in a certain dot.

Generally, printing is effected after the dots **21*f* are heated to some extent. FIG. 22 is a time chart relative to a heating temperature at a certain dot. It should be noted that printing is effected with the use of the dots 21*f* only after the heating temperature reaches Tm as seen in the drawing. This means that time $t_p$ which elapses from the moment when voltage is applied to a predetermined dot 21*f* to the moment when the heating temperature at the dot 21*f* reaches Tm is intended for the purpose of preheating of the dot 21*f* and printing is effected for a period of time $t_h$ after the aforesaid time $t_p$. Accordingly, if an arrangement is so made that the dot 21*f*** has preheating means previously incorporated therein, it is possible to carry out printing at a higher speed.

Figure 23:
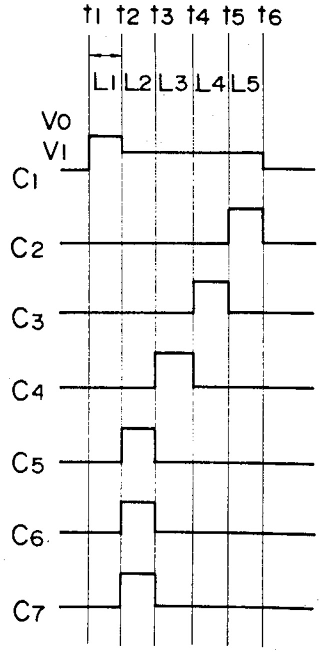
FIG. 23 is a diagram illustrating the timing relation between displacement of the recording head and heating in consideration of preheating.

In the foregoing embodiment a number of heating portions are located at the intersections where a group of scanning electrodes are intersected with a group of signal electrodes at a right angle relative to one another. In the case of the matrix system as mentioned above where electric current is supplied to each of the selected intersections, crosstalk of which the intensity is essentially lower than about 50% is recognized at the selected intersection as defined by the electrodes. This crosstalk functions to appreciably preheat a dot in the case where another dot located just before the first-mentioned dot on the same signal electrode is heated while it is kept in the ON-state on the selected scanning electrode **21*c*. Accordingly, it is desirable to take measures for lowering the ON-voltage in the case where the first-mentioned dot is turned on subsequent to the last-mentioned dot. Accordingly, with respect to the voltage or electric current to be supplied to the signal electrodes 21*e* it is recommendable to prepare more than two kinds of ON signal values in consideration of two cases, one of them being such that the aforesaid voltage or electric current is at least continuously kept in the ON-state and the other one being such that it is not kept in the ON-state. This fact will be described below with reference to FIG. 23** as to the case where a numeral "7" is printed in the same manner as mentioned above. Specifically, voltage to be applied to the signal electrode $C_1$ is so determined that voltage for a period of time between $t_1$ and $t_2$ is kept at a level of $V_o$ and voltage for a period of time between $t_2$ and $t_6$ is kept at a level of $V_1$ which is lower than $V_o$.

Next, the basic pattern of the voltage signal to be supplied to the signal electrodes **21*e* and the scanning electrodes 21*c*** (on the assumption that preheating caused by crosstalk is neglected) will be noted below with reference to its typical examples.

| | | |
|---|---|---|
| signal electrodes | ON (+V) | OFF (floated state) |
| scanning electrodes | selection (O) | OFF (floated state) |
| signal electrodes | ON (+V) | OFF (grounded state) |
| scanning electrodes | selection (−V) | OFF (grounded state) |
| signal electrodes | ON (+V) | OFF (grounded state) |
| scanning electrodes | selection (−V) | OFF (grounded state) |
| signal electrodes | ON (+V) | OFF (floated state) |
| scanning electrodes | selection (−V) | OFF (floated state) |

Incidentally, among the scanning electrodes **21*c* which are not selected, those that are grounded are not shown in the drawing. In this case the recording head 21 should be preferably constructed in such a manner that it is provided with a sliding member which does not come in electrical contact with the scanning brush 21*g***.

In the foregoing embodiment, the recording head 21 is designed in a cylindrical configuration. However, the present invention should not be limited only to this. Alternatively, it may be designed in a column-shaped configuration having a polygonal cross-sectional shape. Further, in the illustrated embodiment the recording head includes seven dots **21*f* as seen in the longitudinal direction but it should of course be understood that it may include a number of dots 21*f*** other than as mentioned above.

Further, the foregoing embodiment has been described with respect to a serial type recording head. However, the present invention may be applied to a full multi-type recording apparatus including a long recording head.

The recording medium 23 may be prepared in such a manner that the surface thereof generally used as a black sheet is coated or laminated with a higher molecular film made of teflon, polypropylene or the like material in order to assure that erasing can be effected manually or automatically. In this case it is possible to repeatedly perform the recording operation.

As described above, the recording head of the invention is so constructed that ink is oozed through a plurality of ink passage holes arranged in a matrix shape in response to image information while, the head is rotated in the contacted state with the recording medium. This makes it possible to carry out clear image recording at a higher operational speed without any use of a conventional ink film as well as without any occurrence of malfunctions such as ink tailing, ink overlapping or the like.

As will be readily apparent from the above description, the present invention has provided a recording head as well as a method of carrying out recording with the use of the head, both of which assure that a clearly recorded image can be obtained at a comparatively low running cost.

We claim:

1. A recording head for recording an image on a recording medium by transferring ink onto said recording medium, comprising:

- an ink containing portion for containing ink;
- a plurality of ink-passing apertures for directing ink contained in said ink containing portion from the inside of said ink containing portion to the outside thereof so as to transfer ink onto said recording medium;
- a plurality of non-contacting scanning electrodes provided on an outside surface of said ink containing portion;

a plurality of non-contacting signal electrodes provided on said outside surface of said ink containing portion so as to cross said plurality of scanning electrodes; and heating means sandwiched between said plurality of scanning electrodes and said plurality of signal electrodes, for heating said ink to cause said ink to pass through said ink-passing apertures.

2. A recording head according to claim 1, wherein said ink containing portion has a cylindrical shape, and wherein said signal electrodes are disposed on said outside surface of said ink containing portion and extend in an axial direction thereof, and further including a single signal contact means for contacting one of said plurality of signal electrodes.

3. A recording head according to claim 1, wherein said ink containing portion has a cylindrical shape, and wherein said scanning electrodes are disposed on said ink containing portion outside surface and extend in an axial direction thereof, and further including a single scanning signal member for contacting one of said plurality of scanning electrodes.

4. A recording head according to claim 1, wherein each of said plurality of ink-passing apertures is disposed at an intersection of one of said scanning electrodes with one of said signal electrodes.

5. A recording head according to claim 1, wherein said ink containing portion has a cylindrical shape, and wherein said scanning electrodes extend axially with respect to said ink containing portion, and wherein said signal electrodes extend circumferentially with rspect to said ink containing portion, and further including:

single scanning brush means for contacting one of said scanning electrodes; and a plurality of signal brush means for contacting said plurality of signal electrodes.

6. A recording head according to claim 1, wherein said ink comprises heat fusible binder.

7. A recording apparatus for recording an image on a recording medium by transferring ink onto said recording medium, comprising:

a recording head for applying ink to a recording medium, said recording head including:

an ink containing portion for containing the ink;

a plurality of non-contacting first electrodes disposed on an outside surface of said ink containing portion;

a plurality of non-contacting second electrodss provided on the outside surface of said ink containing portion so as to cross said plurality of first electrodes at a plurality of intersection points;

heating means sandwiched between said first and second plurality of electrodes at said intersection points; and a plurality of ink-passing apertures disposed at said intersection points for passing ink from an inside of said ink containing portion to an outside thereof so as to transfer ink to said recording medium;

first contact means for contacting said first plurality of electrodes;

second contact means for contacting said second plurality of electrodes; and processing means coupled to said first and second contacting means for energizing said first and second pluralities of electrodes to cause ink to be applied to said recording medium.

8. An apparatus according to claim 7, further including first motor means for driving said recording head, and second motor means for driving said recording medium.

9. An apparatus according to claim 7, wherein said processing means includes:

central processiing means for controlling the energization of said first and second pluralities of electrodes;

memory means for storing recording information used by said central processing means to control said first and second pluralities of electrodes; and driver means for driving said first and second pluralities of electrodes in accordance with instructions from said central processing means.

10. An apparatus according to claim 7, wherein said ink comprises a heat fusible binder.

11. An apparatus according to claim 7, wherein said ink containing portion has a cylindrical shape, and wherein said first plurality of electrodes extend axially with respect to said ink containing portion, and wherein said second plurality of electrodes extend circumferentially with respect to said ink containing portion.

12. An apparatus according to claim 11, further including a first contacting member for contacting one of said plurality of first electrodes at a time, and a plurality of second contacting members for simultaneously contacting each of said plurality of second electrodes.

13. A method of recording on a recording medium by transferring ink onto said recording medium, comprising the steps of:

providing an ink containing portion of a recording head having ink therein, said ink containing portion having a first plurality of non-contacting electrodes on the outside surface of said ink containing portion; a second plurality of electrodes on the outside surface of said ink containing portion so as to cross said plurality of first electrodes at a plurality of intersection points; heating means sandwiched between said first and second pluralitites of electrodes at said plurality of intersection points; and a plurality of ink-passing apertures at said plurality of intersection points for directing ink contained in said ink containing portion from an inside thereof to an outside thereof to transfer ink onto said recording medium;

positioning said recording head adjacent said recording medium; and energizing one of said first plurality of electrodes, and at least one of said second plurality of electrodes to cause ink to flow through the aperture located at the intersection point of the energized first and second electrodes.

14. A method according to claim 13, wherein the ink within said ink containing portion includes a heat fusible binder in the ink.

15. A method according to claim 13, further including the step of displacing said recording head relative to said recording medium.

16. A method according to claim 13, wherein said energizing step includes the step of providing heat to the ink disposed at the intersection point of the energized first and second electrodes to cause a viscosity of said ink to be reduced to cause the ink to flow through the corresponding aperture.

17. A method according to claim 13, wherein said ink containing portion includes a cylindrically shaped ink containing portion, and wherein said first plurality of electrodes extends in an axial direction of said ink containing portion, and said second plurality of electrodes extends in a circumferential direction of said ink containing portion.

18. A method according to claim 17, wherein said step of providing an ink containing portion includes the steps of:

positioning a single first contacting member to contact one of said plurality of first electrodes; and positioning a plurality of second contacting members to contact each of said plurality of second electrodes.

19. A method according to claim 13, further including the steps of:

driving said recording medium with a first motor means; and driving said ink containing portion with a second motor means.

* * * * *

UNITED STATES PATENT AND TRADEMARK OFFICE
CERTIFICATE OF CORRECTION

PATENT NO. : 4,785,311 Page 1 of 2

DATED : November 15, 1988

INVENTOR(S) : Kaneko, et al.

It is certified that error appears in the above-identified patent and that said Letters Patent is hereby corrected as shown below:

COLUMN 1

Line 17, "facximilies" should read --facsimiles--.

COLUMN 5

Line 37, "intersectedwwith" should read --intersected with--.

COLUMN 6

Line 23, "replace" should read --replaced--.

COLUMN 7

Line 46, "pg,20" should be deleted.
Line 55, "it" should be deleted.

UNITED STATES PATENT AND TRADEMARK OFFICE

CERTIFICATE OF CORRECTION

PATENT NO. : 4,785,311 Page _2_ of _2_

DATED : November 15, 1988

INVENTOR(S) : Kaneko, et al.

It is certified that error appears in the above-identified patent and that said Letters Patent is hereby corrected as shown below:

COLUMN 8

Line 48, "heated" should read --heated;--.

COLUMN 11

Line 49, "electrodss" should read --electrodes--.

Signed and Sealed this

Third Day of October, 1989

Attest:

DONALD J. QUIGG

Attesting Officer

Commissioner of Patents and Trademarks